(No Model.)
H. PICHLER.
VALVE FOR HYDRANTS.
No. 577,519. Patented Feb. 23, 1897.
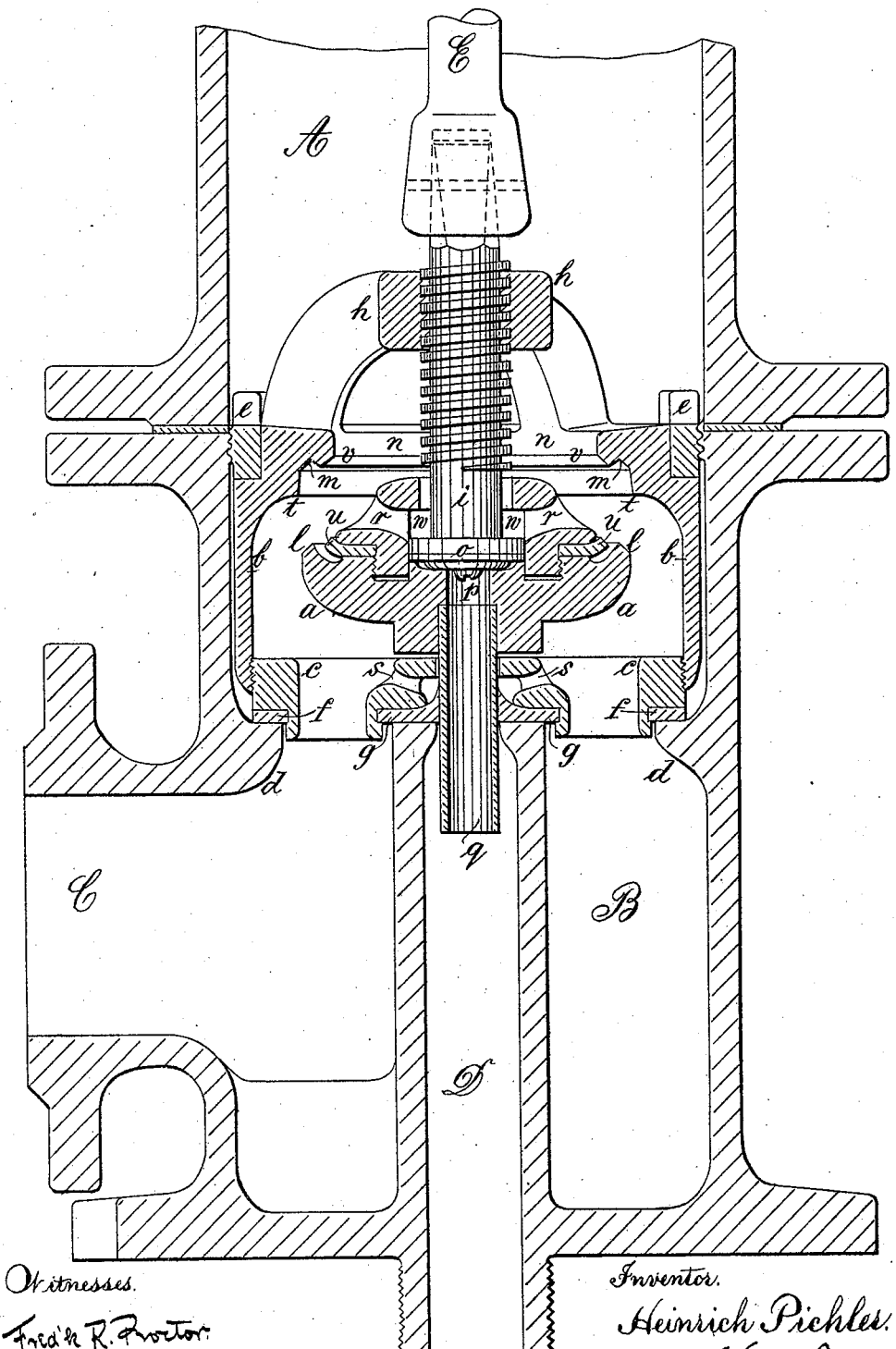

UNITED STATES PATENT OFFICE.

HEINRICH PICHLER, OF FRANKFORT-ON-THE-MAIN, GERMANY.

VALVE FOR HYDRANTS.

SPECIFICATION forming part of Letters Patent No. 577,519, dated February 23, 1897.

Application filed July 13, 1896. Serial No. 598,998. (No model.) Patented in Germany August 31, 1895, No. 84,211; in Austria December 28, 1895, No. 45/5,152; in Hungary December 30, 1895, No. 5,033, and in England January 7, 1896, No. 17,726.

*To all whom it may concern:*

Be it known that I, HEINRICH PICHLER, a subject of the Emperor of Germany, and a resident of Frankfort-on-the-Main, in the Empire of Germany, have invented certain new and useful Improvements in Valves for Hydrants and the Like, (for which I have obtained Letters Patent in Germany, No. 84,211, dated August 31, 1895; in Austria, No. 5,152/45, dated December 28, 1895; in Hungary, No. 5,033, dated December 30, 1895, and in England, No. 17,726, dated January 7, 1896,) of which the following is a specification.

This invention relates to a valve for hydrants, fountains, and the like.

In the accompanying drawing, which is a central vertical section of the valve as applied to a hydrant, A designates the ascending or delivery pipe; B, the lower part, serving as a foundation or pedestal; C, the opening in the foundation or pedestal to serve for connecting the hydrant with the service pipe or main; D, the opening for the discharge of the water which remains in the delivery-pipe A after the valve is closed; E, the spindle-rod for rotating the valve, the said rod being carried up and mounted in the pipe A in the usual manner.

The valve proper is built into the pipe A and lower part B in the following manner: The valve $a$ is situated in the valve-casing $b$, which is made in two parts, and is closed at the bottom by means of a perforated part, such as $c$. This part is screwed tight into the casing $b$ and bears upon the projections $d$ in the lower part B, and also upon the upper edge of the discharge-pipe D. The valve-casing is pressed by means of the screw-threaded annular nut $e$ tightly upon these supports or upon packing rings or washers $f$ and $g$, interposed between them. The valve-casing $b$ carries at its upper part a nut $h$, in which the valve-spindle $i$ works. On rotating this spindle the valve $a$ is caused to rise and fall, the spindle being rigidly connected to the spindle-rod E.

In the accompanying drawing the valve is shown open. The lower end of the spindle $i$ is constructed in the form of a piston $o$, which comprises a metal dish-shaped plate, with a leather disk of the same size, a washer, and a fixing-screw. This piston $o$ fits accurately in a cylindrical space $w$ in the upper part of the valve $a$.

If it is desired to close the valve, the spindle $i$ is rotated, whereupon it rises, and in consequence of the tight fit of the piston $o$ in the cylindrical space $w$ in the upper part of the valve the valve $a$ is lifted, and providing there exists in the spaces B and A a pressure which is greater than the pressure of the atmosphere the valve $a$ will follow the course of the spindle $i$ until its edge $l$ strikes against the edge $m$ of the valve-opening $n$. On further rotation the spindle only moves upward, which causes the piston $o$ of the spindle to uncover the hole $p$ in the valve $a$, and thus establish communication between the pipe A and the discharge-aperture D. The discharge-pipe $q$, which is fitted tight in the valve $a$, connects the hole $p$ with the discharge-pipe D.

In the upper part of the valve $a$ are passages, such as $r$, which are so shaped, as is also the upper part of the valve-casing $b$, that any water that may remain in the ascending pipe A after the valve is closed will run off to the very last drop, thus preventing the freezing in of the valve in the winter-time. The discharge-pipe $q$ is made tight in the discharge-pipe D by means of the cup-leather $g$, suitable passages $s$ $s$ being formed in the part $c$ to enable the water to exert its packing action upon the said cup-leather.

The closing of the valve-opening $n$ by means of the valve $a$ is effected in the following manner: The valve-opening begins at $t$ and tapers in an upward direction, and the outer edge of the valve $a$, at $l$, is beveled, so that as the two parts approach each other the cross-sectional area of the opening is gradually reduced until the parts $l$ and $m$ meet. The tightness against leakage is effected so far only by means of the simple contact of the metal surfaces $l$ and $m$. This "hard" joint is supplemented by a second joint, which consists of a lip, such as $u$, made of rubber or leather, which bears against the edge $v$ of the valve-opening and is firmly pressed against it by the pressure of the water. The lipped ring $u$ is screwed into and made tight in the valve-body $a$ by means of the upper part, which contains the passages $r$.

In order to open the closed valve, the operation is as follows: On rotating the spindle $i$ by means of the spindle-rod E the spindle moves down without the valve $a$, which remains closed by reason of the pressure of the water in the space B until the piston $o$ of the spindle strikes against the bottom of the hole $w$ in the valve $a$, and thus closes the hole $p$, when the valve follows the downward movement of the spindle, and thus opens the valve-opening.

The gradual establishing of the full cross-sectional area of the valve-opening takes place in the reverse manner to that when closing the valve.

With the object of preventing damage to the lip $u$ the pushing off from the bearing $v$ of the valve-seating is effected by means of the edge of the upper part of the valve, which is constructed as a support.

The arrangement of the valve and the construction of the casing are such that all the requisite parts can be taken out of the hydrant without the necessity of removing it from the ground or of taking it to pieces, it being sufficient to unscrew the ring-nut $e$ by means of a suitable tool. All the parts can then be raised out by the spindle-rod E.

Having thus described my invention, the following is what I claim as new therein and desire to secure by Letters Patent:

1. In a hydrant, the combination of a suitable pedestal formed with the supporting-step $d$ and the central discharge D also forming a support, the valve-casing resting upon said step and said discharge, an annular retaining-nut $e$ constructed to screw into the pipe to which the valve is applied and bearing against the valve-casing, whereby the latter may be inserted and withdrawn, and a valve working in the casing and having a tube $q$ working in the discharge, as set forth.

2. In a hydrant, the combination of a suitable pedestal, formed with the annular shoulder $d$ and the central outlet D, the valve-casing resting upon the shoulder and outlet, the valve seated in the valve-casing and having a tube $q$ working in the outlet D and opened at top to the upper side of the valve, and a controlling-stem moving upon and closing the tube $q$ by the act of opening the valve but withdrawing from and opening said tube by the act of closing the valve, as explained.

3. In a valve of substantially the character specified, the combination of the valve-casing having an inner and an outer seat, a valve having a metallic bearing-face constructed to bear against the inner seat and having a lip-shaped washer separated from the metallic bearing-face and arranged to bear against the outer seat and exposed on its inner side to pressure of the water to be controlled, substantially as explained.

4. In a valve, the combination of a casing having an inner and an outer annular valve-seat, a valve of hard material having a face bearing against the inner seat and a lip-shaped washer bearing against the outer seat and spaced apart from the hard bearing-face sufficient to admit the pressure of water behind it in a direction to force it against the seat, and a disk screwed to the valve upon the washer and fitting just within the outer seat in order to draw the washer away from its seat without injury when the valve is opened, as herein explained.

5. In a valve for hydrants and the like, the combination of the valve-casing $b$, formed with the valve-opening $n$, the central outlet for trapped water and the pressure-ducts $s$, the valve $a$ having telescoping tube $q$ working in the escape-opening of the casing and having a packing-washer $g$ flared upwardly toward the pressure-ducts to cause packing by the pressure of the water, upper portion of the valve formed with a cylinder and ports $r$, the valve-stem $i$ for controlling the movement of the valve and having a piston $o$ working in a cylinder in the upper part of said valve and adapted to open and close communication between ports $r$ and the escape-tube $q$ by the operation of closing the same respectively, substantially as set forth.

HEINRICH PICHLER.

Witnesses:
 JEAN GRUND,
 ALVESTO S. HOGUE.